United States Patent
Thompson

(10) Patent No.: US 8,232,323 B2
(45) Date of Patent: Jul. 31, 2012

(54) PROCESS FOR THE MANUFACTURE OF A COLLOID OF IRON OXIDE

(75) Inventor: Russell Martin Thompson, Abingdon (GB)

(73) Assignee: Infineum International Limited (GB)

( * ) Notice: Subject to any disclaimer, the term of this patent is extended or adjusted under 35 U.S.C. 154(b) by 0 days.

(21) Appl. No.: 12/593,337

(22) PCT Filed: Mar. 7, 2008

(86) PCT No.: PCT/EP2008/001834
§ 371 (c)(1),
(2), (4) Date: Sep. 28, 2009

(87) PCT Pub. No.: WO2008/116552
PCT Pub. Date: Oct. 2, 2008

(65) Prior Publication Data
US 2010/0101139 A1   Apr. 29, 2010

(51) Int. Cl.
*C10L 1/22* (2006.01)
*C09K 3/32* (2006.01)

(52) U.S. Cl. .......................................... 516/33; 44/354

(58) Field of Classification Search .................... 516/33; 44/354
See application file for complete search history.

(56) References Cited

U.S. PATENT DOCUMENTS

| 2004/0209782 A1 | 10/2004 | Zhang et al. |
| 2005/0039382 A1* | 2/2005 | Blanchard et al. ............... 44/362 |
| 2005/0060929 A1* | 3/2005 | Caprotti et al. ................. 44/354 |
| 2006/0000140 A1 | 1/2006 | Caprotti et al. |
| 2006/0175230 A1* | 8/2006 | Zhou et al. ..................... 208/113 |

FOREIGN PATENT DOCUMENTS

| EP | 0628612 A | 12/1994 |
| EP | 0671205 A | 9/1995 |
| EP | 1344810 A1 | 9/2003 |
| EP | 1512736 A1 | 3/2005 |

OTHER PUBLICATIONS

R.G.C. Moore et al., "Room-temperature single-electron tunnelling in surfactant stabilised iron nanoparticles", Physica E, vol. 9, 2001, pp. 253-261, XP002481290.
J. Hong et al., "Surface Modification of Hydrophobic Iron Oxide Nanoparticles for Clinical Applications", IEEE Transactions on Magnetics, vol. 41, No. 10, Oct. 1, 2005.

* cited by examiner

*Primary Examiner* — Ling Choi
*Assistant Examiner* — Chun-Cheng Wang

(57) ABSTRACT

The invention concerns a two-stage process for the manufacture of a colloid of iron oxide, and results in the dispersion of the desired iron oxide particles within a carrier fluid by a mixture of mono- and polycarboxylic acids providing excellent properties to the colloid. The process also has the advantage of preserving the physical form of the iron oxide particles, allowing any desired properties of the iron oxide core (such as crystal form or magnetism) to be maintained within the colloid.

13 Claims, No Drawings

PROCESS FOR THE MANUFACTURE OF A COLLOID OF IRON OXIDE

The present invention concerns a process for the manufacture of a colloid of iron oxide. The process involves the dispersion of the desired iron oxide particles within a carrier fluid by a mixture of mono- and polycarboxylic acids providing excellent properties to the colloid. The process also has the advantage of preserving the physical form of the iron oxide particles, allowing any desired properties of the iron oxide core (such as core size and/or shape, monodispersity, crystal form or magnetism) to be maintained within the colloid.

The colloid made according to the process of the invention is useful in particular as an additive for liquid fuels, for supplying iron (in the form of iron oxides) to the combustion chamber of a fuel burner or internal combustion engine where it may effect combustion improvement and/or pass therefrom into the exhaust stream and have other beneficial effects.

In the latter respect, the colloid is particularly useful as an additive for diesel fuel in a method for supplying iron, via the fuel, to the particulate trap of a diesel engine exhaust in a form suitable for promoting trap regeneration. In particular, the method involves the addition to the fuel of a colloid of iron oxide made according to the process of the invention. Combustion of this colloid produces iron-containing compounds, especially iron oxides, which collect in association with the carbonaceous particulate matter in the particulate trap. These iron compounds promote the combustion of this carbonaceous material, either periodically or continuously, in either case leading to a reduction in the amount of particulate retained within the trap and keeping the trap functional over long periods.

Compared with prior art materials, the present colloid in particular shows a lower level of associated deposit formation on the fuel injectors than the iron additives of the prior art. The method is thus particularly suitable for modern engines showing increased susceptibility to fuel injector deposits, especially in the presence in the fuel of metal salts, which appear to accentuate the injector fouling problem. The colloid also shows a balance of properties providing excellent suitability for use as an additive in fuels, and especially in diesel engine on-board dosing devices. In particular, the colloid shows a good balance of desired rheology and stability in fuel.

The colloid made according to the process of the invention is likewise useful in chemical processes requiring the use of iron (in the form of iron oxide) for use as a fluid catalyst.

Furthermore, the process of the present invention is useful for preparing colloids for applications requiring magnetic fluids (sometime called 'ferrofluids') or iron oxide dispersions having particular crystalline forms. Iron oxide exists in a variety of crystalline or amorphous forms, with different structures providing different properties. The process of the present invention allows the manufacture of a colloid having improved stability (i.e. a colloidal dispersion that remains stable for longer) by incorporation therein of a mixture of mono- and polycarboxylic (and preferably a mixture of mono- and dicarboxylic) acids as dispersing means, whilst preserving the iron oxide form in the starting material. Thus, the desired form of iron oxide can be initially selected with regard to the desired end properties required from the colloid, and its dispersibility thereafter improved by incorporation of the dispersing means according to the process of this invention.

EP-A-1 512 736 describes diesel fuels containing a colloidally dispersed or solubilised metal catalyst compound which can be used for particulate trap regeneration. Example 9 demonstrates the formation of a 're-organised' colloid, in which a concentrate of the prior art colloid Eolys® 176 (a mixed colloidal dispersion of cerium and iron oxide) is stabilised by the addition thereto of stabiliser A (polyisobutylene succinic acid). The document does not teach the reaction conditions of the present process, and does not specifically disclose the reaction of a first colloid, consisting of iron oxide particles stabilised by monocarboxylic acid in a carrier fluid, with the dicarboxylic acid required by the present invention.

A process for the manufacture of a colloid consisting of iron oxide particles dispersed in a carrier fluid by means of a mixture of mono- and polycarboxylic acids, the process comprising the following steps:

a) preparing or otherwise obtaining a first colloid consisting of iron oxide particles dispersed in a carrier fluid, the dispersing means within the first colloid being one or more monocarboxylic acids; and
b) reacting the first colloid with one or more additional carboxylic acids consisting of one or more polycarboxylic acid compounds (or precursors thereof) and optionally also one or more monocarboxylic acid compounds, to form the desired colloid of iron oxide wherein the additional carboxylic acids have been incorporated as dispersing means;

wherein the reaction in stage b) is effected by admixture of the first colloid and the additional carboxylic acids, followed by heating to a temperature of between 100° C. and 180° C. for a period of between 1 and 10 hours under stirring, the reaction being conducted in the carrier fluid as solvent; and wherein water is additionally present to effect in situ hydrolysis of any polycarboxylic acid precursor when any such precursor is used.

The second aspect of the present invention concerns the colloid obtainable by the process of the first aspect.

The features of the invention are hereafter described in more detail.

The Process of the First Aspect of the Invention

The process of the invention comprises two stages. Stage a) of the process involves the formation of a colloid of iron oxide particles dispersed in a carrier fluid by means of one or more monocarboxylic acids. Stage b) involves the improvement of the dispersing means by the incorporation into the colloid of one or more polycarboxylic acid compounds, and optionally also one or more additional monocarboxylic acid compounds. Preferably, stage b) involves the improvement of the dispersing means by the incorporation into the colloid of one or more dicarboxylic acid compounds, and optionally also one or more additional monocarboxylic acid compounds. For convenience the polycarboxylic acid(s) may be added in the form of their precursor(s), and especially in anhydride form, with the acid groups generated in situ by hydrolysis of the anhydride ring.

The first colloid produced in stage a) of the process is hereafter referred to as the 'stock dispersion'.

In stage a), the particles of iron oxide(s) desired for the colloid core may be directly dispersed in the monocarboxylic acid dispersing means of choice, by mixing the appropriate form of finely-divided iron oxide(s) together with the dispersing means within the carrier fluid, for example by a comminution or ball milling process.

Alternatively, for the preferred the stock dispersion consisting essentially of the magnetite crystalline form of iron oxide, the magnetite may first be prepared chemically from a solution of a mixture of iron(II) and iron(III) salts in water in a 1:2 ratio, to which is added ammonium hydroxide causing the bare nanoparticles of magnetite to form in an inorganic polymerisation-condensation reaction. Monocarboxylic acid, for example oleic acid, is then added to this nanoparticle dispersion with stirring and heating to coat the particles (which settle to the bottom of the flask). These oleate particles are soluble or dispersible in organic solvents. The water layer may be decanted off and the residual water in the product removed, for example by azeotropic distillation.

Depending on the ultimate application for the colloid, the desired iron oxide core may be crystalline or amorphous, although the process of the invention is particularly suitable for preserving crystalline structure within the iron oxide core. In this specification and claims, the terms "crystalline" and "amorphous" used in relation to the iron oxide core have defined meanings. The core is crystalline if, under X-Ray diffraction of the colloid, one or more sharp peaks are observed which are attributable to the existence of a defined crystal structure or lattice within its core. The core is amorphous if no such attributable peaks are observed.

A suitable protocol for conducting the required X-Ray diffraction of the colloid is firstly to prepare the sample for scanning by applying the relevant liquid (colloid) directly onto a silicon low background substrate, and allowing the sample to dry. The sample forms a viscous tacky film which can then be investigated. Suitable X-Ray data can be collected from 2-70 degrees 2theta on a Philips PW1800 automatic powder X-ray diffractometer using Copper K alpha radiation generated at 40 kV and 55 mA, and a 4 second per point count time.

Iron oxide itself can exist in a variety of forms dependent upon the oxidation state (or mixture of oxidation states) of the iron therein, and the conditions to which it has been exposed. In this specification and claims, the term "iron oxide" is used generically to mean both true iron oxides and also iron hydroxides and iron oxide-hydroxides generally referred to in the art under the term 'iron oxide'. In all cases however, no metals other than iron are present within the iron oxide, and thus the colloid core consists of iron as the only metal, in combination with oxygen and/or hydrogen depending upon the precise form(s) of iron oxide present.

It is preferred that the iron oxide particles within the colloid consist essentially of crystalline form(s) of iron oxide. Such crystalline forms of iron oxide specifically include the oxides magnetite ($Fe_3O_4$), hematite ($\alpha$-$Fe_2O_3$) and maghemite ($\gamma$-$Fe_2O_3$) as well as other iron (III) oxide forms such as the iron (II) oxide "Wustite FeO". Of these true oxides, magnetite, hematite and maghemite are preferred, with magnetite being most preferred. Magnetite and hematite in particular can be mined in ore form in large quantities.

Crystalline forms of iron hydroxides and iron oxide-hydroxides specifically include goethite ($\alpha$-FeOOH) and lepidocrocite ($\gamma$-FeOOH) as well as the $\delta$-FeOOH (synthetic) and $\delta'$-FeOOH (mineral) forms, ferrihydrite $Fe_5O_8 \cdot 4H_2O$, bernalite $Fe(OH)_3$ and $Fe(OH)_2$. Goethite in particular is a thermodynamically stable form and is available in rocks and ochre deposits. Lepidocrocite occurs in rocks and soils, and ferrihydrite is widespread in natural surface environments. Of the iron hydroxides and iron oxide-hydroxides, the goethite and lepidocrocite forms are most preferred.

Preferably the crystalline iron oxide core of the colloid consists essentially of the crystalline form magnetite, optionally also incorporating lesser quantities of one or more of the hematite, maghemite, goethite or lepidocrocite forms. A core consisting of magnetite is the most preferred form of crystalline iron oxide for use in the present invention, optionally in combination with goethite, giving rise to colloids with excellent magnetism.

In particular, when crystalline colloids in accordance with this invention are used as fuel additives, they are surprisingly associated with lower levels of oxidative degradation in the fuel than other sources of iron. The crystalline colloid thus provides a means of supplying iron in a fuel whereby advantages of iron are not significantly offset by an adverse effect on fuel oxidative stability. This advantage is apparent in both petroleum-based fuel and also in mixtures of petroleum fuel and biofuel.

The dispersing means for the first colloid consist of one or more monocarboxylic acids, preferably one or more aliphatic monocarboxylic acids containing between 8 and 20 carbon atoms. Preferably, the or each monocarboxylic acid contains between 10 and 18 carbon atoms. Such acids may be straight or branched chain acids, and include saturated straight chain acids such as decanoic acid, dodecanoic acid, tetradecanoic acid, hexadecanoic acid and octadecanoic (stearic) acid, as well as mixtures thereof; saturated branched chain acids such as neodecanoic acid and isostearic acid; and furthermore include monounsaturated acids such as cis-9-hexadecenoic (palmitoleic), cis-6-octadecenoic (petroselinic), cis-9-octadecenoic (oleic), cis-11-octadecenoic (cis-vaccenic) and cis-15-tetradecenoic (nervonic) acids, and polyunsaturated fatty acids such as 9,12-octadecadienoic (linoleic), 6,9,12-octadecatrienoic ($\gamma$-linoleic) and 9,12,15-octadecatrienoic ($\alpha$-linoleic) acids.

Of these acids, the unsaturated acids are preferred, with oleic acid per se, or mixtures consisting essentially of oleic acid, being most preferred as the dispersing means for the colloid.

Alternatively, the stock dispersion can be obtained from a suitable supplier as an item of commerce.

In stage b) of the process, the desired colloid of iron oxide is prepared by effecting a reaction on the stock dispersion to incorporate the additional acid compounds into the colloid. Depending on the stoichiometry of the reaction, this incorporation may lead to a proportion of the initial dispersing means (monocarboxylic acid) being displaced from the colloid. Thus, for example, a stock dispersion dispersed by oleic acid may thereafter be reacted with one or more alkenyl succinic acids to incorporate the alkenyl succinic acids within the colloid, causing a partial or whole replacement of the oleic acid as dispersing means.

The incorporation reaction of stage b) is suitably performed by charging the stock dispersion and additional carboxylic acid(s) into any suitably-sized reactor. Preferably, the reactor is thereafter purged with nitrogen gas and sealed at atmospheric pressure, before being heated with stirring to the desired temperature for the desired duration.

The reaction in stage b) is effected by heating to a temperature of between 100° C. and 180° C. for a period of between 1 and 10 hours. Such conditions cause the incorporation of the additional carboxylic acids into the structure of the colloid, so giving rise to the advantageous properties thereof, in advantageous yields.

Preferably, the reaction in stage b) is effected by heating to a temperature of between 130° C. and 160° C. for a period of between 2 and 6 hours. More preferably, the reaction in stage b) is effected by heating to a temperature of between 140° C. and 150° C. for a period of between 3 and 4 hours. Such conditions give particularly good yields and particularly desirable colloid products.

In a preferred embodiment of the process, the reaction in stage b) is conducted without reflux. To this end, it is also preferred that the carrier fluid has a reflux temperature above that temperature used for the reaction in stage b). The absence of reflux reduces the likelihood of the colloid structure being unduly disrupted during the heating phase.

During stage b) of the process, a moderate pressure rise can be observed within the reactor.

After the desired reaction period, the temperature of the reaction mixture is decreased and the desired colloid product drained from the reactor once it has cooled. The concentrated stabilised colloidal dispersion may be diluted down to the desired % Fe with additional carrier fluid if desired.

Displaced dispersing means may be removed as desired, or allowed to remain within the finished product, depending upon the end application.

It is advantageous to monitor the progress of the incorporation reaction in stage b). Fourier Transform Infrared Spectroscopy (FT-IR) provides a particularly convenient method to monitor the reaction progress, by observing the appearance of the polycarboxylate group in the colloid. Thus, for example, when using alkenyl succinic acid as the polycarboxylic acid in stage b), a small peak appears at 1545 cm$^{-1}$ which corresponds to formation of colloid surface-bound alkenyl succinate.

Alternatively, the progress of the reaction may be monitored by means of standard chemical chromatography. For example, the appearance of a new colloidal species may be assessed using Thin Layer Chromatography (TLC). The presence of monocarboxylic acid in the reaction medium over time, if a proportion thereof is replaced by the stabilising ligand, may also be conveniently monitored using High Pressure Liquid Chromatography (HPLC).

Alternatively, evidence for ligand incorporation may be determined after the reaction using Thermogravimetric Analysis (TGA) to determine the characteristic distillation/decomposition temperature of surface-bound versus free carboxylates in the sample compared to that of the starting material used.

The additional carboxylic acid(s) incorporated in stage b) preferably consist of one or more dicarboxylic acids, wherein preferably at least one of the acids is a hydrocarbyl-substituted dicarboxylic acid containing between 8 and 200 carbon atoms. Alternatively, the additional carboxylic acids consist of one or more aliphatic monocarboxylic acids containing between 8 and 20 carbon atoms in combination with at least one dicarboxylic acid preferably being a hydrocarbyl-substituted dicarboxylic acid containing between 8 and 200 carbon atoms.

In general, the polycarboxylic acid(s) used in stage b)—and especially the dicarboxylic acid(s) preferably used in stage b)—may conveniently be added to the reaction mixture in precursor form, and thereafter generated in situ within the reactor, permitting the formation of the desired colloid. Thus, the teaching herein regarding preferred features of the polycarboxylic acid should be understood to apply both to the acid form expressly described and also to the precursor thereof, and particularly to the anhydride thereof. The required hydrolysis can be easily effected by the co-addition of water to the reaction mixture in step b).

In the first, more preferred embodiment the additional carboxylic acid(s) used in stage b) consist of one or more hydrocarbyl-substituted dicarboxylic acids containing between 8 and 200 carbon atoms. Preferably, the or each hydrocarbyl-substituted dicarboxylic acid is a hydrocarbyl-substituted succinic acid, more preferably an alkenyl or polyalkenyl succinic acid, preferably a polyalkenyl succinic acid.

As used within this specification and claims, the term 'hydrocarbyl substituent' means a monovalent chemical substituent having hydrocarbonaceous character, and consisting of carbon and hydrogen atoms (and optionally heteroatoms such as oxygen, nitrogen and sulphur, provided that the presence of such heteroatoms neither affects the hydrocarbonaceous character of the substituent, nor provides additional functional groups able to compete with carboxylate groups on the surface of the colloid). In each of the preferred embodiments of the dicarboxylic acid, the hydrocarbyl substituent consists of carbon and hydrogen atoms (only), wherein the hydrocarbyl substituent is preferably a monovalent saturated (i.e. alkyl), or more preferably mono or poly-unsaturated substituent, such as alkenyl. Branched chain substituents are preferred.

The preferred maximum size of such the hydrocarbyl substituents is 160 carbon atoms, preferably 80 carbon atoms. Preferably, the substituents contain at least 12 carbon atoms, and more preferably at least 18 carbon atoms. Branched-chain substituents, and especially alkenyl or polyalkenyl substituents, containing between 18 and 80 carbon atoms are most preferred.

Preferably, a mixture of hydrocarbyl-substituted dicarboxylic acids is used. More preferably, the mixture is a mixture of dicarboxylic acids wherein each acid is an alkenyl- or polyalkenyl-substituted succinic acid and wherein the mixtures preferably consist essentially of (and more preferably consist of) succinic acids which carry only one branched-chain polyalkenyl substituent, preferably containing between 18 and 80 carbon atoms.

In this latter preferred embodiment, the substituent on each succinic acid may be derived from polymerised olefins, such as polyethylene, polypropylene or (preferably) polybutylene such as polyisobutene. A preferred substituent is derived from polyisobutene of number average molecular weight (as measured by gel permeation chromatography ('GPC') against polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s).

A further preferred embodiment of the present invention is that wherein the dispersing means consists of one or more aliphatic-substituted succinic acids derived from the structure (I):

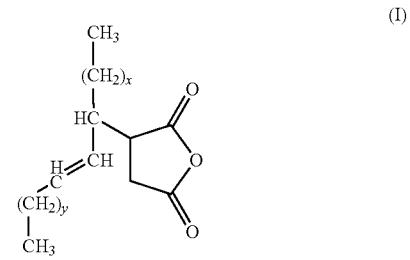

wherein x and y are independent integers whose sum is 9 to 29, preferably 11 to 21, and more preferably 11 or 13. Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

In the second, less preferred embodiment of the invention, the additional carboxylic acid(s) used in stage b) consist of one or more hydrocarbyl-substituted dicarboxylic acids containing between 8 and 200 carbon atoms in combination with one or more monocarboxylic acids containing between 8 and 20 carbon atoms. In this embodiment, the preferred embodiments previously described for the hydrocarbyl-substituted dicarboxylic acids may suitably be combined with one or more of the above-stated monocarboxylic acids.

Thus, one or more monocarboxylic acids containing between 8 and 20 carbon atoms may be combined with one or more hydrocarbyl-substituted dicarboxylic acids containing between 8 and 200 carbon atoms, wherein the or each hydrocarbyl-substituted dicarboxylic acid is preferably a hydrocarbyl-substituted succinic acid, more preferably an alkenyl succinic acid or most preferably a polyalkenyl succinic acid.

In such mixtures, the preferred maximum size of such hydrocarbyl substituents is 160 carbon atoms, preferably 80 carbon atoms. Preferably, the substituents contain at least 12 carbon atoms, and more preferably at least 18 carbon atoms. Branched-chain substituents, and especially alkenyl or polyalkenyl substituents, containing between 18 and 80 carbon atoms are most preferred.

Preferably, a mixture of hydrocarbyl-substituted dicarboxylic acids is used in such a mixture. More preferably, each acid in the mixture is an alkenyl- or polyalkenyl-substituted succinic acid and wherein the mixtures consist essentially of (and preferably consist of) succinic acids which each carry only one branched-chain polyalkenyl substituent, preferably containing between 18 and 80 carbon atoms.

In this latter preferred embodiment, the substituent on each succinic acid may be derived from polymerised olefins, such as polyethylene, polypropylene or (preferably) polybutylene such as polyisobutene. A preferred substituent is derived from polyisobutene of number average molecular weight (as measured by gel permeation chromatography ('GPC') against polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s).

A further preferred embodiment is that obtained by employing, in combination with the one or more carboxylic acids, one or more aliphatic-substituted succinic acids derived from the structure (I):

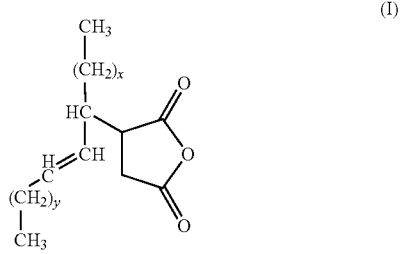

wherein x and y are independent integers whose sum is 9 to 29, preferably 11 to 21, and more preferably 11 or 13. Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

Thus, in this embodiment, the additional carboxylic acids used in stage b) consist of one or more polyalkenyl-substituted succinic acids in combination with one or more aliphatic monocarboxylic acids containing between 10 and 18 carbon atoms.

In a preferred embodiment, the additional carboxylic acids used in stage b) consist of oleic acid and one or more polyisobutenyl succinic acids, the polyisobutenyl group(s) of which have a number average molecular weight (as measured by gel permeation chromatography, against polystyrene standards) of between 450 and 2300.

Most preferably in the second embodiment of the invention, the additional carboxylic acids used in stage b) consist of one or more polyisobutenyl-substituted succinic acids in combination with one or more aliphatic monocarboxylic acids containing between 10 and 18 carbon atoms. The combination of oleic acid and a mixture of polyisobutylene-substituted succinic acids, wherein the polyisobutylene substituents have a number average molecular weight (as measured by GPC) in the range of 700 to 1300, and particularly the range of 900-1000, is preferred.

It is particularly preferred in both the first and second embodiments that the above hydrocarbyl-substituted dicarboxylic acids and, where also present, the above monocarboxylic acids form the dispersing means for particles which consist essentially of crystalline form(s) of iron oxide, and especially which consist essentially of magnetite.

A preferred feature of the present invention is the weight ratio of total carboxylic acid(s):iron in the final colloid (measured as the total weight of acid compound(s):weight of elemental iron contained within the iron oxide particles). The weight ratio of total carboxylic acid(s):iron in the colloid is relevant in controlling the properties of the final colloid, and hence its suitability for particular end applications.

In particular, the weight ratio of total carboxylic acid(s):iron in the final colloid, measured as the total weight of acid compound(s):weight of elemental iron contained within the iron oxide particles, is preferably in the range of 6:1 to 1:4. Preferably, this weight ratio is in the range of 4:1 to 1:2, more preferably 2:1 to 1:2. Most preferably, this weight ratio is in the range of 1.5:1 to 1:2.

In the context of the process of the present invention, this weight ratio is a function of the relative proportions of iron (within the iron oxide starting material) and carboxylic acids used over the two stages of the process. Thus, a desired weight ratio can be achieved by appropriate selection of these three variables.

In the process, particularly good results have been obtained when the weight ratio of monocarboxylic acid(s):iron used in stage a) of the process is in the range of 0.2:1 to 0.6:1. Preferably, this weight ratio is 0.4:1.

Likewise, particularly good results have been obtained when the weight ratio of additional carboxylic acid(s):iron used in stage b) of the process is in the range of 0.5:1 to 3:1. Preferably, this weight ratio is 1:1 to 2:1, more preferably 1:1.

More preferably, in the process the weight ratio of monocarboxylic acid(s) to iron used in stage a) of the process is in the range of 0.2:1 to 0.6:1, and is particularly 0.4:1; and the weight ratio of additional carboxylic acid(s) to iron used in stage b) of the process is in the range of 0.5:1 to 3:1, preferably 1:1 to 2:1, and is particularly 1:1.

The weight ratio of total carboxylic acid(s):iron in the final colloid controls several properties. In particular, the viscosity of the final colloid decreases as the weight ratio of carboxylic acid(s):iron decreases. Thus, lower ratios provide the colloid with the lower viscosity characteristics, and are more suitable for applications requiring low viscosity products. Conversely, higher viscosity application favour higher ratio products.

However, the stability of the colloid within organic media follows the reverse trend. Thus, increasing the weight ratio of carboxylic acid(s):iron in the colloid improves its stability.

Conversely, decreasing the ratio adversely effects the stability, and provides less desirable physical behaviour in organic media.

The ratio range defined for the present invention provides the optimum balance of these properties. Within the broad range of 6:1 to 1:4, the skilled person is provided a general range of useful colloid compositions from which a material having the optimum balance for a given circumstance can be chosen.

In the colloid, the iron oxide particles are dispersed in a carrier fluid, so providing a concentrate form suitable for use as an additive.

The colloid can be made to various concentration levels, as desired for the end application. In such concentrates, the colloid is typically present in concentrations containing up to 40% iron by weight, and preferably between 5 and 20%, more preferably between 15 and 25% by weight, per weight of colloid.

Suitable carrier fluids for the colloid include aromatic solvents such as the commercial mixed aromatic solvents Solvesso and Shellsol, and aliphatic solvents such as isoalkanes, including Isopar L. Other suitable solvents known in the additives art may be used, such as Norpar (pentanes), Exxsol (dearomatised hydrocarbon fluids), Nappar (naphthenics), Varsol (non-dearomatised hydrocarbon fluids), xylenes, and HAN 8080 (aromatic solvent).

Where the final colloid is used in fuel as an additive, a colloid concentration within the fuel sufficient to provide between 1 and 200, and preferably between 2 and 100, more preferably between 3 and 50 ppm of iron in the fuel (where "ppm" is parts per million of elemental iron, by weight, per weight of fuel) will be useful.

In general, higher levels of iron in the fuel will result in greater catalytic activity, but will additionally result in a greater mass of iron-containing compound(s) which, if burnt, will produce "ash" and contribute to overall particulate mass measured for emissions regulation purposes. Thus, the optimum iron concentration for a particular engine will typically be the lowest concentration obtaining the required catalytic properties. It is a further advantage of the present invention that the iron colloid results both in combustion improvement and, where a particulate trap is fitted to the combustion device, in the formation of iron-containing compounds having a high catalytic activity within the trap.

The fuel to be treated with the colloid in this application may be a fuel oil, such as a diesel fuel oil (whether for marine, railroad or road use) or heating oil. Diesel fuel oils and heating oils generally boil within the range of from 110° C. to 500° C., e.g. 150° C. to 400° C. The fuel oil may comprise atmospheric distillate or vacuum distillate, cracked gas oil, or a blend in any proportion of straight run and thermally and/or refinery streams such as catalytically cracked and hydrocracked distillates.

Other examples of diesel fuel oils include Fischer-Tropsch fuels. Fischer-Tropsch fuels, also known as FT fuels, include those described as gas-to-liquid (GTL) fuels, biomass-to-liquid (BTL) fuels and coal conversion fuels. To make such fuels, syngas ($CO+H_2$) is first generated and then converted to normal paraffins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types to arrive at a fuel suitable for use as diesel fuel.

Suitable examples of diesel fuel derived from oils or fats of animals and/or plants are those derived from rapeseed oil, coriander oil, soyabean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include oils derived from corn, jute, sesame, shea nut, ground nut and linseed oil and may be derived therefrom by methods known in the art. Rapeseed oil, which is a mixture of fatty acids partially esterified with glycerol is available in large quantities and can be obtained in a simple way by pressing from rapeseed. Recycled oils such as used kitchen oils are also suitable.

Also suitable are alkyl ester derivatives of the fatty acid constituents of animal and plant oils and fats. Such esters can be obtained conventional means, for example by trans-esterification, or by saponification followed by re-esterification. Consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred lower alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, coriander, castor, soyabean, peanut, cotton seed, beef tallow etc. Alkyl esters of fatty acids based on a variety of rapeseed oil, the fatty acid component of which is derived to more than 80 wt % from unsaturated fatty acids with 18 carbon atoms, are preferred.

Whilst many of the above oils may be used, preferred are vegetable oil derivatives, of which particularly preferred biofuels are alkyl ester derivatives of rapeseed oil, cottonseed oil, soyabean oil, sunflower oil, olive oil, or palm oil, rapeseed oil methyl ester being especially preferred.

At present, fuels derived from oils or fats of animals and/or plants are most commonly used in combination with petroleum-derived fuels. The present invention is applicable to mixtures of such fuels in any ratio. For example, at least 2% and preferably at least 5%, more preferably at least 25%, for example more than 50% by weight of these fuel mixtures may be derived from a plant or animal source.

The diesel fuel may be a fuel for a road vehicle. Such fuels are typically classified in Europe by various well-known industry standards and can contain low or very low sulphur contents, such as at most 50 ppm sulphur, or even at most 10 ppm of sulphur or less by weight, per weight of fuel.

The fuel may be a marine diesel fuel, in particular having one or more of the following characteristics:
(i) a 95% distillation point (ASTM D86) of greater than 330° C., preferably greater than 360° C., more preferably greater than 400° C., and most preferably greater than 430° C.;
(ii) a cetane number (measured by ASTM D613) of less than 55, such as less than 53, preferably less than 49, more preferably less than 45, most preferably less than 40, (iii) an aromatic content of greater than 15% wt, preferably greater than 25% and more preferably greater than 40%; and (iv) a Ramsbottom carbon residue (by ASTM D 524) of greater than 0.01% mass, preferably greater than 0.15% mass, more preferably greater than 0.3% mass, such as 1% or 5% mass, and most preferably greater than 10% mass.

Such diesel fuels (and particularly such marine diesel fuels) may in particular contain streams such as streams produced from fluid catalytic cracking, such materials usually having a density @ 15° C. of 850 to 970, such as 900 to 970 kg/m$^3$ and characterised by low cetane number values, typically ranging from 10 or lower to around 30 to 35; from thermal cracking processes, like visbreaking and coking, such streams typically having a density range @ 15° C. of 830 to 930 kg/m$^3$ and a cetane value of 20 to 50; and from hydrocracking that uses severe conditions, e.g. temperature in excess of 400° C. coupled with pressures of 130 bars or greater, to produce streams characterised by cetane number from 45 to 60 and having a density range @ 15° C. from 800 to 860 kW$^3$.

Typically, marine fuels accord with the standard specification ASTM D-2069 and may be either distillate or residual fuels as described within that specification, and may in particular have sulfur contents of greater than 0.05%, preferably greater than 0.1%, more preferably greater than 0.2% and particularly greater than 1% or even 2% by weight, especially in the case of residual fuel oils, and a kinematic viscosity at 40° C. in cSt of at least 1.40.

The fuel may also contain other additives. A particular advantage of the composition of the invention is the resistance to destabilisation that the final colloid offers when the fuel composition additionally comprises a lubricity additive, particularly where such additive is the mono- or bis-glycol (or polyglycol) ester of a polycarboxylic acid (and especially of a dicarboxylic acid, such as a dimer of unsaturated fatty acids such as oleic acid). Such compositions show excellent stability and provide the fuel user with more reliable operation in the method aspect stated above.

The lubricity additive is typically present in amounts in the range of 25 to 500 ppm, preferably 50 to 250 ppm, and more preferably 100 to 200 ppm by weight per weight of fuel.

EXAMPLES

The present invention in its various aspects is hereafter illustrated by the following examples.

Preparative Examples

P1—Example of the process of the invention
P2—Preparation of further examples and comparative examples Working Examples W1—effect of carboxylic acid:iron ratio on colloid viscosity and fuel stability
W2—improved oxidative stability of fuel containing the colloid of the invention Example P1

Example of the Process of the Invention

A first colloidal nanodispersion of crystalline iron oxide in oleic acid (the 'stock dispersion') was prepared. This stock dispersion comprised 30% Fe (by weight, per weight of colloid) and 11% weight of oleic acid, dispersed in Isopar-L as carrier fluid. This stock dispersion was subsequently used for a series of incorporation reactions to form the series of colloids of the invention recited in subsequent examples. By X-Ray diffraction, the iron oxide core consisted of a mixture of magnetite and a minor proportion of goethite.

The weight ratio of oleic acid:iron within the stock dispersion was 11:30, i.e. 1:2.7.

In the second stage of the preparation, the above stock dispersion was further reacted with a series of chosen carboxylic reactants in the incorporation reaction, to form colloids dispersed by mixtures of mono- and dicarboxylic acids in accordance with the invention.

The reaction is exemplified by the following, used to prepare colloid example number 7 below. 650.0 g of the oleic acid-iron oxide stock dispersion (30% w/w Fe, dispersed in Isopar-L solvent) was charged into a 2 liter Parr reactor along with 250.0 g of "Glissopal SA" polyisobutylene succinic anhydride (containing 78% active ingredient in diluent, the polyisobutylene having a number average molecular weight of approximately 1000) and 3.49 g of deionised water to effect in situ hydrolysis of the anhydride group to dicarboxylic acid.

The charging weight ratio of dicarboxylic acid:iron (weight:weight) in stage b) was thus effectively 1:1, i.e. 195 g of polyisobutylene succinic anhydride (78% of 250 g): 195 g of iron (30% of 650 g). When using other carboxylic acids to displace the oleic acid, the required amount of acid can be calculated analogously, based on the desired ratio of total acid:iron in the resulting colloid, and the active ingredient level of the carboxylic acid product used.

The reactor was then purged with nitrogen gas and sealed at atmospheric pressure. The reactor was heated with stirring at 4000 rpm to 140° C. Upon reaching the desired temperature, the stirring under temperature was continued for a further 3 hours. During the process the pressure within the reactor was noted to reach a maximum of 14 psi. After 3 hours, the temperature of the reaction mixture was decreased (using a cooling water coil) and the colloid product drained from the reactor once it had cooled below 30° C.

The resulting product contained the desired colloid, in which the polyisobutylene succinic acid had incorporated into the colloid as dispersing means. Any displaced oleic acid from the stock dispersion remained in the product, and thus final weight ratio of total acid:iron in the product was 1.4:1.

The concentrated stabilised colloid prepared as above may be diluted down to the desired % Fe level with additional carrier fluid, as desired.

Example P2

Preparation of Further Examples and Comparative Examples

Using the above-exemplified two-step method, a series of crystalline colloid examples 1 to 8 were prepared. In each case, the same stock dispersion starting material (see example P1 above) was employed, but the additional carboxylic acid was varied.

The series of final colloids was prepared using dicarboxylic reactant in stage b), in which the weight ratio of dicarboxylic acid used in the second stage of the preparation:iron used was 1:1, and a range of different alkenyl succinic acids were employed. The resulting colloids had the acid constituents and iron contents (in percent weight) shown in the table below. In each preparation, the anhydride was used as the diacid precursor and water added to the reaction mixture to facilitate in situ hydrolysis of the anhydride group.

Examples of Crystalline Colloids 1 to 8

| Colloid | Example Number | Carboxylic acid used during colloid preparation | Colloid Fe content (% weight) |
|---|---|---|---|
| Alkenyl succinic acid preparations | 1 | Dodecenyl succinic acid ($C_{12}$, branched) | 26.4 |
| | 2 | Hexadecenyl succinic acid ($C_{16}$, branched) | 28.4 |
| | 3 | Octadecenyl succinic acid ($C_{18}$, branched) | 27.4 |
| | 4 | Polyisobutylene$_{450}$SA ($C_{32}$, branched) | 25.28 |
| | 5 | Polyisobutylene$_{700}$SA ($C_{49}$, branched) | 25.66 |
| | 6 | Polyisobutylene$_{950}$SA ($C_{67}$, branched) | 27.16 |
| | 7 | Polyisobutylene$_{1000}$SA ($C_{70}$, branched) | 24.96 |
| | 8 | Polyisobutylene$_{2300}$SA ($C_{161}$, branched) | 25.0 |

Notes:
1) in the above Table, the nomenclature "Polyisobutylene$_x$SA ($C_y$, branched)" means a polyisobutylene succinic acid of number average molecular weight 'x' (as measured by GPC, against polystyrene standards), which number average molecular weight corresponds to an average carbon number y.
2) "Comp" means comparative example.

In these examples, the dispersing means in the colloid consisted of a proportion of residual oleic acid (remaining from the starting material) and the mono- or di-carboxylic acid incorporated during stage two of the preparation. The overall ratio of carboxylic acid:iron in the product was therefore in excess of that ratio of acid added in stage 2 by a value of about 0.4. Thus a ratio of 1:1 was used in the examples below in stage two, with the final ratio in each colloid product being about 1.4:1.

A second series of crystalline colloid examples 9 to 13 were prepared, using the above method and dicarboxylic acid used in example P1, but varying the ratio of dicarboxylic acid:iron used in the preparations, to permit investigation of the effect of this ratio.

| Colloid | Example Number | Dicarboxylic acid used during preparation (stage 2) | Colloid Fe content (% weight) | Ratio of diacid:Fe used in preparation | Overall ratio of diacid:Fe in product |
|---|---|---|---|---|---|
| Alkenyl succinic acid preparations | 9 | Polyisobutylene$_{950}$SA | 18 | 2:1 | 2.4:1 |
| | 10 | Polyisobutylene$_{950}$SA | 24 | 1:1 | 1.4:1 |
| | 11 | Polyisobutylene$_{950}$SA | 25 | 1:1.3 | 1.14:1 |
| | 12 | Polyisobutylene$_{950}$SA | 29 | 1:2 | 1:1.14 |
| | 13 | Polyisobutylene$_{950}$SA | 30 | 1:4 | 1:1.6 |

A third series of crystalline colloid examples 14 to 19 were prepared, using the above method but varying the dicarboxylic acid(s) used in the preparations, to exemplify colloids produced by mixtures of dicarboxylic acids.

| Colloid | Example Number | Dicarboxylic acids used during preparation (stage 2) | Colloid Fe content (% weight) | Ratio of acid1:acid2:Fe used in preparation |
|---|---|---|---|---|
| Mixed alkenyl succinic acid preparations | 14 | Polyisobutylene$_{1000}$SA and Polyisobutylene$_{450}$SA | 16.67 | 1:1:1 |
| | 15 | Polyisobutylene$_{1000}$SA and Polyisobutylene$_{700}$SA | 16.70 | 1:1:1 |
| | 16 | Polyisobutylene$_{1000}$SA and Polyisobutylene$_{2300}$SA | 17.19 | 1:1:1 |
| | 17 | Polyisobutylene$_{1000}$SA and Dodecenyl succinic acid | 17.54 | 1:1:1 |
| | 18 | Polyisobutylene$_{1000}$SA and Hexadecenyl succinic acid | 17.58 | 1:1:1 |
| | 19 | Polyisobutylene$_{1000}$SA and Octadecenyl succinic acid | 17.59 | 1:1:1 |

Example W1

Effect of Carboxylic Acid:Iron Ratio on Colloid Viscosity and Fuel Stability The series of crystalline colloids prepared as examples 9 to 13 above, and having different ratios of dicarboxylic acid:iron present therein, were used to investigate the effect of varying the total carboxylic acid:iron weight ratio on relevant physical properties. The colloids differed in percentage iron content as a result of the different ratios used, i.e. the lower ratios contained higher proportions of iron. Each resulting colloid was analysed for its iron content (in % wt of colloid) and tested for its kinematic viscosity and its stability in diesel fuel, measured using the following techniques:

Kinematic viscosity—measurement of viscosity according to the test procedure ASTM D-445 (entitled 'Standard Test Method for Kinematic Viscosity of Transparent and Opaque Liquids (and calculation of Dynamic Viscosity'). In summary, this standard method measures the time for a volume of liquid to flow under gravity through a calibrated glass capillary viscometer.

Stability in diesel fuel—visual observation during static storage at 80° C. of a Class I diesel fuel containing 75 ppm (by weight, per weight of fuel) of the colloid reaction product. In this test, the appearance of haze or precipitate in the fuel sample over time indicates instability (failure).

The viscosity results clearly indicate the lower viscosities provided by colloids with lower ratios of acid:iron. In particular, a large decrease in viscosity was seen between the 2.4:1 and 1.4:1 colloid examples.

The examples within the ratio range of 1.5:1 to 1:2 showed the lowest viscosity behaviour and additionally offered the highest iron concentrations, making them particularly suitable for on board vehicle applications wherein high iron concentration, low viscosity additives are most advantageous.

Test Colloids and Resulting Kinematic Viscosity

| Colloid example | Overall weight ratio of diacid:iron | Iron in colloid (% wt) | Kinematic viscosity at temperature shown, as measured by ASTM D-445 (cSt) | | | | |
|---|---|---|---|---|---|---|---|
| | | | $-20°$ C. | $-10°$ C. | $0°$ C. | $20°$ C. | $40°$ C. |
| 17 | 2.4:1 | 18 | 21250 | 7919 | 3346 | 790 | 257 |
| 18 | 1.4:1 | 24 | 2831 | 1270 | 634 | 208 | 88 |
| 19 | 1.14:1 | 25 | 1736 | 813 | 444 | 152 | 65 |
| 20 | 1:1.14 | 29 | 652 | 340 | 198 | 79 | 39 |
| 21 | 1:1.6 | 30 | 273 | 154 | 95 | 44 | 24 |

These viscosity benefits are preserved when translated into a series of more dilute colloids wherein the iron content has been equalised at 10% wt. Moreover, these colloids show significant viscosity advantages over concentrates of the commercially available fuel additive 'iron neodecanoate' (an iron salt), even when the latter is used at lower iron contents in the same solvent carrier. Thus, by employing the colloid of the invention, more concentrated fuel additives with lower, more advantageous viscosities can be prepared.

Kinematic Viscosity of Test Colloids at Constant Iron Content

| Colloid example | Overall weight ratio of diacid:iron | Iron in dilute colloid (% wt) | Kinematic viscosity at temperature shown, as measured by ASTM D-445 (cSt) | | | | |
|---|---|---|---|---|---|---|---|
| | | | $-20°$ C. | $-10°$ C. | $0°$ C. | $20°$ C. | $40°$ C. |
| 15 | 2.4:1 | 10 | 83 | 48 | 32 | 15 | 9 |
| 16 | 1.4:1 | 10 | 18 | 12 | 9 | 5 | 4 |
| 17 | 1.14:1 | 10 | 15 | 10 | 7 | 4 | 3 |
| 18 | 1:1.14 | 10 | 10 | 7 | 5 | 3 | 2 |
| 19 | 1:1.6 | 10 | 8 | 6 | 5 | 3 | 2 |
| Iron neodecanoate in | | 6 | 483 | 219 | 103 | 35 | 14 |
| concentrate form | | 4 | 43 | 25 | 15 | 7 | 4 |

As can be seen, iron neodecanoate at an iron concentrate level of only 6% produced viscosities far in excess of that provided by any of the colloids of the invention containing iron at the higher concentration of 10%. It was necessary to dilute the iron neodecanoate to a level as low as 4 wt % (iron) to prepare a concentrate having superior viscosity to the worst performing colloid of the invention (only). Given that iron additives are typically used at a target iron level in the fuel, this difference in usable iron concentration permits the use of lower quantities of additive to meet the fuel iron concentration target.

Fuel Stability Results

The fuel stability tests on the above iron colloids demonstrated that the colloids wherein the ratio of acid:iron was 2.4:1 and 1.4:1 were still stable after 33 days storage, at which time the test was discontinued. The colloids having the 1.14:1 ratio showed signs of instability after 19 days, and the colloid having the 1:1.6 ratio showed signs of instability after 26 days.

Further stability tests were conducted in the presence of 150 ppm of a lubricity additive known to destabilise metallic additives, namely an ethoxylated oleic acid dimer. In these tests, the 2.4:1 and 1.4:1 colloids were partly destabilised by the addition of the additional additive, instability being observed after 19 days, although this degree of stability still represented good performance in an absolute sense. However, the other colloids were not significantly destabilised, indicating that colloids with lower ratios (in the range below 1:1) are particularly useful when fuel stability is required in the presence of that class of lubricity additives.

Example W2

Improved Oxidative Stability of Fuel Containing the Colloid of the Invention

The presence of iron in fuel has been associated with a deterioration in oxidative stability of the fuel under industry standard test conditions. The colloid of the present invention provides iron in a form which, in the fuel, is associated with a lesser degree of oxidative degradation.

The ASTM D 2274 test was used in the following example measure the inherent stability of middle distillate petroleum fuel under specified oxidising conditions at 95° C. In this test, a sample of filtered test fuel is aged at 95° C. for 16 hours whilst oxygen is bubbled through the sample at a rate of 3 liters/hour. After this aging process, the sample is re-filtered. The quantity of filtered insolubles produced over the course of the test serves as one measure of the degree of oxidation which has taken place. Likewise, any adherent insolubles are removed from the reaction vessel by solvent washing, and serve as a second measure. The sum of adherent and filtered insolubles is reported as 'total insolubles' generated over the course of the test, and reported as milligrams per 100 milliliters of test fuel. The higher this figure, the more oxidative degradation has occurred.

A class I diesel fuel, and the same fuel additionally containing 5% and 10% by weight of biofuel (known commercially as 'FAME', or fatty acid methyl ester, being a mixture of methyl esters derived from fatty acids obtained from plant oils such as rapeseed oil) was tested in conjunction with the colloid of the invention, or other sources of iron (ferrocene, i.e. dicyclopentadienyl iron, and the salt of iron and neodecanoic acid). In all cases, the oxidative degradation of fuel samples containing the preferred crystalline colloid of the invention was significantly lower than that of fuel samples containing other forms of iron added at the same elemental iron concentration (10 ppm iron by weight, per weight of fuel).

The results are shown in the table below.
ASTM D 2274 Results for Iron Compounds

| Petroleum fuel | FAME (% by weight) | Additive (added at 10 ppm elemental iron) | Total insolubles (mg/100 ml) | Type of iron |
|---|---|---|---|---|
| Class I diesel fuel | 0 | none | 0.12 | — |
| Class I diesel fuel | 0 | ferrocene | 2.00 | organometallic |
| Class I diesel fuel | 0 | iron neodecanoate | 5.00 | salt |
| Class I diesel fuel | 0 | Example 6 | 0.10 | crystalline colloid |
| Class I diesel fuel | 5 | none | 1.80 | — |
| Class I diesel fuel | 5 | ferrocene | 0.50 | organometallic |
| Class I diesel fuel | 5 | iron neodecanoate | 2.40 | salt |
| Class I diesel fuel | 5 | Example 6 | 0.30 | crystalline colloid |
| Class I diesel fuel | 10 | none | 0.20 | — |
| Class I diesel fuel | 10 | ferrocene | 0.40 | organometallic |
| Class I diesel fuel | 10 | iron neodecanoate | 1.70 | Salt |
| Class I diesel fuel | 10 | Example 6 | 0.10 | crystalline colloid |

The invention claimed is:

1. A process for the manufacture of a colloid consisting of iron oxide particles dispersed in a carrier fluid by means of a mixture of mono- and polycarboxylic acids, said process comprising the following steps:
   a) mixing a first colloid consisting of iron oxide particles dispersed in a carrier fluid, dispersing means within the first colloid being one or more monocarboxylic acids with one or more additional carboxylic acids consisting of one or more polycarboxylic acid compounds (or precursors thereof) to form the desired colloid of iron oxide; and
   b) heating the admixture of the first colloid and the additional carboxylic acids to a temperature of between about 100° C. and about 180° C. for a period of between about 1 and 10 hours under stirring whereby a reaction is conducted in the carrier fluid as solvent; and wherein water is additionally present to effect in situ hydrolysis of any polycarboxylic acid precursor when any such precursor is used.

2. The process of claim 1, wherein the admixture is heated to a temperature of between 130° C. and 160° C. for a period of between 2 and 6 hours.

3. The process of claim 1 wherein the admixture is heated to a temperature of between 140° C. and 150° C. for a period of between 3 and 4 hours.

4. The process of claim 1 wherein the carrier fluid has a reflux temperature above that used for the reaction and wherein the reaction is conducted without reflux.

5. The process of claim 1 wherein the iron oxide particles within the colloid consist essentially of crystalline form(s) of iron oxide.

6. The process of claim 1 wherein additional carboxylic acids are incorporated with the one or more polycarboxylic acid compounds in the carrier fluid, dispersing means within the first colloid and said additional carboxylic acids consists of one or more hydrocarbyl-substituted dicarboxylic acids containing between 8 and 200 carbon atoms, or anhydride precursors thereof.

7. The process of claim 6, wherein the or each dicarboxylic acid is a hydrocarbyl-substituted succinic acid.

8. The process of claim 1 wherein the additional carboxylic acids consist of one or more hydrocarbyl-substituted dicarboxylic acids containing between 8 and 200 carbon atoms (or anhydride precursors thereof) in combination with one or more monocarboxylic acids containing between 8 and 20 carbon atoms.

9. The process of claim 8, wherein said additional carboxylic acids consist of one or more aliphatic-substituted succinic acids in combination with one or more aliphatic monocarboxylic acids containing between 10 and 18 carbon atoms.

10. The process of claim 9, wherein said additional carboxylic acids consist of oleic acid and polyisobutenyl succinic acid, the polyisobutenyl group of which has a number average molecular weight (as measured by gel permeation chromatography, against polystyrene standards) of between 450 and 2300.

11. The process of claim 1 wherein the weight ratio of carboxylic acid(s) to iron in the colloid, measured as the total weight of acid compound(s):weight of elemental iron contained within the iron oxide particles, is in the range of from 6:1 to 1:4.

12. The process of claim 11, wherein said ratio is from about 2:1 to about 1:2.

13. The process of claim 1 wherein the iron oxide particles within the colloid consist essentially of magnetite.

* * * * *